United States Patent [19]
Omaru et al.

[11] Patent Number: 5,639,575
[45] Date of Patent: Jun. 17, 1997

[54] NON-AQUEOUS LIQUID ELECTROLYTE SECONDARY BATTERY

[75] Inventors: Atsuo Omaru, Kanagawa; Masayuki Nagamine; Naoyuki Date, both of Fukushima, all of Japan

[73] Assignee: Sony Corporation, Tokyo, Japan

[21] Appl. No.: 582,047

[22] Filed: Jan. 2, 1996

Related U.S. Application Data

[63] Continuation of Ser. No. 257,000, filed as PCT/JP93/01769, Dec. 12, 1993, published as WO94/14205, Jun. 23, 1994, abandoned.

[30] Foreign Application Priority Data

Dec. 4, 1992 [JP] Japan ................... 4-325748

[51] Int. Cl.$^6$ ................................ H01M 6/14
[52] U.S. Cl. ................................ 429/197
[58] Field of Search ................... 429/194, 197

[56] References Cited

U.S. PATENT DOCUMENTS 5,561,005  10/1996  Omaru et al. ............ 429/197

FOREIGN PATENT DOCUMENTS

| | | |
|---|---|---|
| 0541889A1 | 5/1993 | European Pat. Off. |
| 63-36315 | 2/1988 | Japan. |
| 63-121248 | 5/1988 | Japan. |
| 2-010666 | 1/1990 | Japan. |
| 2-66856 | 3/1990 | Japan. |
| 2-82466 | 3/1990 | Japan. |
| 2-172162 | 7/1990 | Japan. |

OTHER PUBLICATIONS

Kitamura et al, Abstract For Japanese Koka:, 2–172162 Jul. 3, 1990.
Kuriyama, Kokai, 355770, Mar. 11, 1991.
Ofuku, Kokai, 2172163, Jul. 3, 1990.

*Primary Examiner*—Stephen Kalafut
*Assistant Examiner*—Jonathan S. Krueger
*Attorney, Agent, or Firm*—Hill, Steadman & Simpson

[57] ABSTRACT

A non-aqueous liquid electrolyte secondary battery using a carbon material satisfying predetermined conditions of true density and parameters of crystalline structure as an anode material, a transition metal composite oxide having predetermined ion supply capability as a cathode material, and ethylene carbonate as a non-aqueous solvent, is disclosed. The carbon material has a true density of 2.2 g/cm$^3$ and greater, an interplanar distance of (002) plane of between 0.375 and 0.338 nm, inclusive a C-axis crystallite size of the (002) plane of 20.0 nm and greater and a G value in Raman spectrum of 2.5 and greater. The transition metal composite oxide contains lithium of an amount equivalent to a charge/discharge capacity of 300 mAh and greater per unit weight of the carbon material. The carbon material forming the anode has a grain diameter of 1 μm and greater. The non-aqueous solvent is a mixed solvent of ethylene carbonate and chain carbonic ester. As the chain carbonic ester, diethyl carbonate, dimethyl carbonate or methylethyl carbonate is employed.

4 Claims, 1 Drawing Sheet

NON-AQUEOUS LIQUID ELECTROLYTE SECONDARY BATTERY

This application is a continuation of application Ser. No. 08/257,000, filed as PCT/JP93/01769, Dec. 12, 1993, published as WO94/14205, Jun. 23, 1994, now abandoned.

TECHNICAL FIELD

This invention relates to a non-aqueous liquid electrolyte secondary battery using a carbon material for its anode.

BACKGROUND ART

As technologies in electronics have been remarkably evolved, a variety of electronic equipment has become smaller and lighter. Accordingly, it has been required that batteries as portable power sources be increasingly smaller, lighter, and higher in energy density.

Conventionally, aqueous solution type secondary batteries, such as lead batteries and nickel-cadmium batteries, are primarily used as secondary batteries for general use. However, though these aqueous solution type secondary batteries exhibit excellent cyclic properties, they are not satisfactory in weight and energy density.

Meanwhile, recently, a non-aqueous liquid electrolyte secondary battery using lithium or a lithium alloy for its anode has been researched and developed prevalently. This non-aqueous liquid electrolyte secondary battery has a high energy density, exhibits only a small amount of self-discharge, and is lightweight. However, in the non-aqueous liquid electrolyte secondary battery, lithium is crystallized in dendritic form in proceedings of charge/discharge cycles, and the crystallized lithium finally reaches the cathode to generate an internal short circuit. Therefore, it is difficult to employ this non-aqueous liquid electrolyte secondary battery for practical use.

On the contrary, a lithium ion based non-aqueous liquid electrolyte secondary battery which uses a carbon material for its anode has attracted attention for the following reasons. The non-aqueous liquid electrolyte secondary battery utilizes dope and undope of lithium into and from between carbon layers. By doing so, the battery does not exhibit the dendritic precipitation of lithium in the charge even though charge/discharge cycles proceed. The battery exhibits satisfactory charge/discharge cyclic properties.

Meanwhile, the carbon materials are roughly categorized into low-crystalline carbon materials, such as cokes and glass like carbon, having a pseudo-graphite structure or a turbostratic structure, and high-crystalline carbon materials, such as graphite, having a grown crystalline structure.

Among these carbon materials, the low-crystalline carbon material has conventionally been used as the anode material of the non-aqueous liquid electrolyte secondary battery, because of its high compatibility with propylene carbonate (PC) normally used for the non-aqueous solvent of the non-aqueous liquid electrolyte secondary battery.

That is, both the non-aqueous liquid electrolyte secondary battery using metallic lithium for the anode and the non-aqueous liquid electrolyte secondary battery using a carbon material for the anode have conventionally employed PC as the main component of the non-aqueous solvent of the liquid electrolyte. Using PC for the non-aqueous solvent is advantageous in that it forms a film stable with metallic lithium, particularly in the non-aqueous liquid electrolyte secondary battery using metallic lithium for the anode.

If the non-aqueous liquid electrolyte secondary battery mainly using PC for the non-aqueous solvent has the anode formed of the low-crystalline carbon material, a practical charge/discharge capacity can be obtained. However, if the battery has the anode formed of the high-crystalline carbon material, the anode is not sufficiently doped with lithium and the practical charge/discharge capacity cannot be obtained. A conceivable reason therefor is that, with the anode formed only of the high-crystalline carbon material, as PC decomposes on the anode surface to generate a propylene gas and form lithium carbonate, the capacity is consumed in the reaction, disturbing the lithium dope into the anode, as reported in A. N. Dey and B. P. Sullivan, J. Electrochem. Soc., Vol. 117, 1970, page 222.

Actually, however, the high-crystalline carbon material has a higher true density than the low-crystalline carbon material. Therefore, in order to assure a satisfactory electrode packing property to obtain a high energy density, it is much more advantageous to use the high-crystalline carbon material as the anode material.

Thus, to make such a high-crystalline carbon material usable, a mixed solvent of PC and ethylene carbonate (EC) is reported in J. Electrochem. Soc., Vol. 137, No. 7, 1990, page 2009. According to this report, by using the mixed solvent of PC and EC, it is possible to carry out charge/discharge with the anode formed of a graphite material.

However, since this mixed solvent has only poor wettability with a porous polypropylene film used in a practical battery and also has a high viscosity, it does not exhibit satisfactory properties.

Since non-aqueous solvents suitable for the high-crystalline carbon material have not been found as described above, the anode performance of the high-crystalline carbon material is not currently considered. However, as a higher energy density is being demanded of the non-aqueous liquid electrolyte secondary battery, it is critical to sufficiently utilize the properties of the high-crystalline carbon material.

DISCLOSURE OF THE INVENTION

In view of the above-described status of the art, it is an object of the present invention to provide a non-aqueous liquid electrolyte secondary battery which exhibits a high electrode packing property and a high energy density.

The present inventors have found through intensive studies that a high-crystalline carbon material having predetermined true density and crystalline parameters is satisfactory particularly in lithium dope property and electrode packing density. The present inventors have also found that a non-aqueous solvent of EC mixed with chain carbonic ester as a low-viscosity solvent is preferred for the anode formed of such a high-crystalline carbon material to exhibit its performance sufficiently.

A non-aqueous liquid electrolyte secondary battery of the present invention has been completed on the basis of the above findings. The non-aqueous liquid electrolyte secondary battery of the present invention includes an anode formed of a carbon material having a true density of not smaller than 2.1 g/cm$^3$, an interplanar distance of the (002) plane of smaller than 0.34 nm, a C-axis crystallite size of the (002) plane of not smaller than 14.0 nm and a G value in the Raman spectrum of not smaller than 2.5, a cathode formed of a transition metal composite oxide containing lithium of an amount equivalent to a charge/discharge capacity of not less than 250 mAh per unit weight of the carbon material, and a liquid electrolyte formed by dissolving an electrolyte into a non-aqueous solvent containing ethylene carbonate.

The carbon material forming the anode has a grain diameter of not smaller than 1 μm.

The non-aqueous solvent of the liquid electrolyte is a mixed solvent of ethylene carbonate and chain carbonic ester.

The ethylene carbonate and the chain carbonic ester are mixed at a volume ratio of 10:90 to 60:40.

The chain carbonic ester is diethyl carbonate.

The non-aqueous solvent is mixed with diethyl carbonate (DEC) and dimethyl carbonate (DMC) as the chain carbonic ester.

The diethyl carbonate and the dimethyl carbonate are mixed at a volume ratio of 30:70 to 80:20.

The chain carbonic ester is asymmetrical chain carbonic ester.

The asymmetrical chain carbonic ester is methylethyl carbonate.

The electrode packing property is improved if a carbon material having a true density of not smaller than 2.1 g/cm$^3$, an interplanar distance of the (002) plane of less than 0.34 nm, a C-axis crystallite size of the (002) plane of not smaller than 16.0 nm and a G value in the Raman spectrum of not smaller than 2.5 is used as the anode material in the lithium ion based non-aqueous liquid electrolyte secondary battery.

By using the carbon material as the anode material, a transition metal composite oxide containing lithium of an amount equivalent to a charge/discharge capacity of not less than 250 mAh per unit weight of the carbon material as the cathode material, and a non-aqueous solvent consisting mainly of ethylene carbonate, the capacity performance of the carbon material can be sufficiently exhibited and a high energy density can be obtained.

If the carbon material having a grain diameter of 1 μm or greater is used, an irreversible capacity available only for charge but not for discharge is reduced and the charge/discharge capacity is increased.

If chain carbonic ester, more preferably asymmetrical chain carbonic ester or a mixed solvent of DEC and DMC, is added as the second component solvent to the non-aqueous solvent consisting mainly of EC, a high conductivity can be obtained and reliability in use at low temperatures and high temperatures are improved.

BEST MODE FOR CARRYING OUT THE INVENTION

Figure 1:
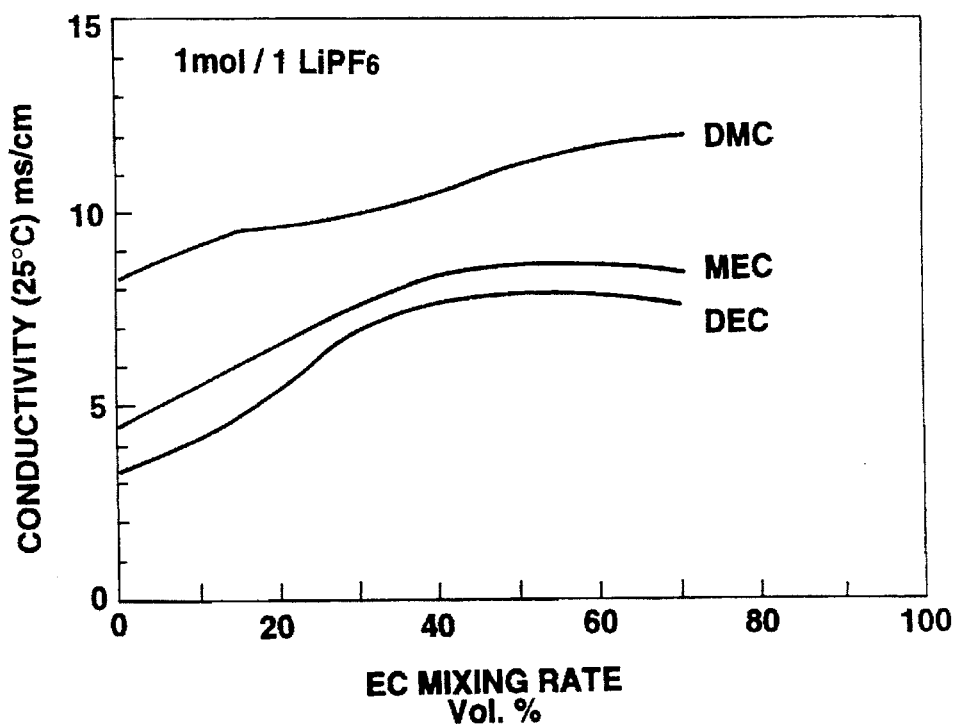
FIG. 1 is a graph showing the relation between the EC mixing rate of the non-aqueous solvent and conductivity at 25° C.

The non-aqueous liquid electrolyte secondary battery of the present invention uses a carbon material satisfying predetermined conditions of true density and crystalline structure parameters as the anode material, to assure a satisfactory electrode packing property and obtain a high energy density.

That is, the true density of the carbon material relates with the electrode packing property. By using a carbon material having a true density of not less than 2.1 g/cm$^3$, more preferably, not less than 2.18 g/cm$^3$, a high electrode packing property can be obtained.

The parameters of crystalline structure prescribed in the present invention are an interplanar distance of the (002) plane measured by X-ray diffraction, a C-axis crystallite size of the (002) plane and a G value observed in the Raman spectrum. The interplanar distance of the (002) plane and the C-axis crystallite size of the (002) plane are indices of an average crystalline structure of the whole material. The G value is an index of minute defects of the crystalline structure, expressed by a ratio of the integrated intensity of a signal derived from a graphite structure of the carbon material to the integrated intensity of a signal derived from an amorphous structure in the Raman spectrum.

These parameters of the crystalline structure of the carbon material relate with performance of the anode, such as the true density and the charge/discharge capacity. A higher electrode packing property, a higher charge/discharge capacity, and thus a high energy density can be obtained by using the carbon material having these parameters of the crystalline structure within the following range.

That is, it is essential that the carbon material has an interplanar distance of the (002) plane of less than 0.34 nm, more preferably not less than 0.335 nm and not greater than 0.338 nm, and a C-axis crystallite size of the (002) plane of not less than 16.0 nm. In addition, it is preferred that the carbon material has a G value of not smaller than 2.5. If the G value is smaller than 2.5, the true density of not less than 2.1 g/cm$^3$ may not be obtained.

As the carbon material having the above-described parameters of the crystalline structure, natural graphite, or artificial graphite formed by carbonizing an organic material and heating the carbonized material at high temperatures may be used.

To form the artificial graphite, an organic material, such as coal or pitch, is typically used as a starting material.

The pitch is exemplified by pitch formed from tar formed on high-temperature thermal decomposition of coal tar, ethylene bottoms or crude oil, or from asphalt, through distillation (such as vacuum distillation, atmospheric distillation or steam distillation), thermal polycondensation, extraction or chemical polycondensation, and pitch formed in wood carbonization.

It is also possible to use high molecular compounds, such as polyvinyl chloride resin, polyvinyl acetate, polyvinyl butylate, and 3,5-dimethyl phenol resin, as starting materials of the pitch.

These coal, pitch and high molecular compounds are in liquid states at the highest temperature of approximately 400° C. in the carbonization process. By being held at that temperature, these materials have aromatic cycles condensed into a polycyclic stacked state. Then, if heated at approximately 500° C. or higher temperatures, these materials form solid carbon precursors, that is, semi-cokes. Such a process is called a liquid-phase carbonization process, which is a typical formation process of graphitizable carbon.

Other starting materials can be exemplified by: condensed polycyclic hydrocarbon compounds, such as, naphthalene, phenanthrene, anthracene, triphenylene, pyrene, perylene, pentaphene, and pentacene; derivatives thereof, such as, carboxylic acids, carboxylic anhydrides, and carboxylic imides; mixtures of the foregoing compounds; condensed heterocyclic compounds, such as, acenaphtylene, indole, isoindole, quinoline, isoquinoline, quinoxaline, phthalazine, carbazole, acridine, phenazine, and phenanthridine; and derivatives thereof.

To form desired artificial graphite using the above-mentioned organic starting materials, it is necessary, first to carbonize the organic material in a nitrogen stream at 300° to 700° C., then to calcine the carbonized material in the nitrogen stream at the temperature rising rate of 1° to 20° C. per minute, the ultimate temperature of 900° to 1500° C., with the retention time of approximately 0 to 5 hours at the ultimate temperature, and subsequently to heat the material at 2000° C. or higher temperatures, preferably 2500° C. or higher. As a matter of course, carbonization or calcination may be omitted in some cases.

The carbon material is ground and classified into powdery states to be used as the anode material. The grinding for the artificial graphite may be conducted at any time of before or after carbonization, calcination or high-temperature processing, or in the temperature rising process.

It is preferable to use the carbon material powder having a grain diameter of not smaller than 1 μm as the anode material. An anode material containing a large amount of carbon material powder of a grain diameter of smaller than 1 μm increases the irreversible capacity available only for charge but not for discharge in the initial stage of the charge/discharge cycle. Although the reason therefor is not made clear, it can be considered that the carbon material powder of a grain diameter of smaller than 1 μm has a large specific surface area and hence a large reactive area with the liquid electrolyte, and is thus likely to have a side reaction.

The upper limit of the grain diameter of the carbon material powder differs in accordance with the size and structure of the battery to which the carbon material powder is to be applied. It is preferable to set the upper limit within a range not exceeding at least the thickness of the separator. Since a cylindrical battery has an electrode of spiral structure in which thin electrodes and separators are alternately stacked and wound, the upper limit of the grain diameter is set in a range of relatively small diameters. For a large battery, the grain diameter can be set in a range of large diameters.

Meanwhile, in order to cause the anode to exhibit its maximum capacity, a transition metal compound capable of supplying, to the anode, Li of an amount equivalent to the charge/discharge capacity of not less than 250 mAh, preferably not less than 300 mAh, more preferably 330 mAh, per gram of the carbon material is used as the cathode material forming the cathode.

The ion supply capability is set by measuring the discharge capacity of the battery. Therefore, the ion supply source for achieving the above ion supply capability is not limited to the cathode. Essentially, it suffices that ions of the amount equivalent to the above-mentioned charge/discharge capacity exist in the battery system. Also, the above-described ion supply capability needs to be maintained in a stationary state, such as, after repeating the charge/discharge for approximately five times.

The transition metal compound as the cathode material is exemplified preferably by a lithium-transition metal composite oxide expressed by a general formula, $Li_xMO_2$ with M indicating at least one of Co and Ni, x being $0.05 \leq x \leq 1.10$, or by an intercalation compound containing Li.

As the non-aqueous liquid electrolyte of the non-aqueous liquid electrolyte secondary battery, a non-aqueous solvent mixed with an electrolyte is employed.

It is essential that the non-aqueous solvent is unlikely to decompose on reduction of the high-density anode. In the present invention, a non-aqueous solvent containing EC is used. EC is stable with the reduction of the high-density anode. Therefore, by forming the non-aqueous solvent of EC, the capacity of the anode can be sufficiently exhibited.

If the non-aqueous solvent is formed only of EC, the wettability with a resin porous separator is insufficient and thus the conductivity cannot be sufficient. In addition, since EC has a relatively high melting point of 25.6° C., low-temperature properties are not satisfactory. For these reasons, it is desirable to add a second component solvent to the non-aqueous solvent to improve the properties.

Chain carbonic ester is employed as the second component solvent. Particularly, diethyl carbonate (DEC), a mixed solvent of DEC and dimethyl carbonate (DMC), and asymmetrical chain carbonic ester, such as methylethyl carbonate (MEC) or methylpropyl carbonate (MPC), are suitable as the second component solvent. If any of these chain carbonic ester is added as the second component solvent to the non-aqueous solvent, the conductivity is improved and EC is prevented from decomposing. Thus, reliability in use at low temperatures and high temperatures is improved.

In mixing EC with the second component solvent, it is preferable to set the volume ratio of EC: the second component solvent in a range of 2:8 to 8:2, more preferably 1:9 to 6:4. If the mixing rate of EC is less than 10% by volume, the stability of the liquid electrolyte is in sufficient, lowering the conductivity. If the mixing rate of EC exceeds 60% by volume, the conductivity particularly at low temperatures is lowered in response to poor low-temperature properties of EC due to its relatively high melting point. At low temperatures, the optimum range of the EC mixing rate varies, depending upon the second component solvent to be used. For instance, if DEC is used as the second component solvent, the EC mixing rate is set to not more than 60% by volume. If DMC is used, the EC mixing rate is set to not less than 30% by volume. If MEC is used, the EC mixing rate is set to 10 to 60% by volume. Thus, a high conductivity can be obtained. Accordingly, if the properties are problematical at low temperatures as well as normal temperatures, it is desirable to select the EC mixing rate in accordance with the type of the second component solvent.

Meanwhile, though DMC has a low viscosity and a high conductivity, it has a narrow temperature range for the liquid phase with a high melting point of 0° C. and a low boiling point of 90° C. For this reason, it is preferable to use DMC in combination with DEC for the second component solvent.

When a mixed solvent only of DMC and EC is used for the electrolyte, extremely micro portions are solidified at ambient temperatures not higher than the melting point, lowering discharge performance. At ambient temperatures not higher than −30° C., the liquid electrolyte soaked into the electrode is solidified in that state, damaging the electrode and lowering the battery performance. On the other hand, at ambient temperatures not lower than 100° C., the internal pressure detecting safety unit of the battery wrongly operates, and the battery cannot be used any more. The ambient temperatures not higher than −30° C. can be experienced by, for example, transporting the battery by way of polar regions. The temperatures not lower than 100° C. can easily be experienced by leaving the battery in an automobile in summer. The battery cannot be sufficiently practical unless it has durability against such low temperatures and high temperatures. Consequently, it is necessary to combine DMC to be used as the second component solvent with DEC.

By thus combining DEC with DMC, the following point of DEC can be improved. Stated differently, the above combination lowers the possibility that DEC reacts with the lithium metal precipitated on the anode when the battery is overcharged, raising the battery temperatures. Therefore, the combination is advantageous for assuring safety.

It is preferable to set the mixing volume ratio of DEC:DMC within a range of 2:8 to 8:2, more preferably 3:7 to 8:2. If the content of DMC exceeds the above range, the low-temperature property is lowered. If the content of DEC exceeds the above range, the conductivity at room temperature is slightly insufficient and the problem of the reaction of precipitated lithium with DEC in the overcharged battery arises.

The liquid electrolyte is formed by adding an electrolyte to such a non-aqueous solvent. Any electrolyte usable for this type of battery can be employed in this case. For instance, $LiClO_4$, $LiAsF_6$, $LiPF_6$, $LiBF_4$, $LiB(C_6H_5)_4$, $CH_3SO_3Li$, $CF_3SO_3Li$, $LiCl$ and $LiBr$ can be employed.

Preferred embodiments of the present invention will now be described. However, it is to be understood that the present invention is not limited to these embodiments.

EXAMPLE 1

First, a coal pitch coke was calcined at 1200° C. and then heat-treated at 3000° C. in an inactive atmosphere to form a carbon material. The carbon material was then ground to form a carbon material powder. The interplanar distance $d_{002}$ of the (002) plane, the crystallite size $Lc_{002}$ of the (002) plane and the G value of the carbon material powder are shown in Table 1. The true density and the grain diameter are shown in Table 2.

The interplanar distance $d_{002}$ of the (002) plane and the crystallite size $Lc_{002}$ of the (002) plane were measured with a powder X-ray diffraction method. The grain diameter was measured with a laser diffraction method, and the true density was measured with pycnometer.

The G value in the Raman spectrum was measured as follows.

[Raman Spectroscopic Method]

A reagent powder was secured on a slide glass and was irradiated with an excitation light with a beam diameter of 1 nmφ by a spectroscope (trade name: JOBIN YVON U-1000). A scattered light thus generated was converged in configuration of pseudo-back scattering to have the spectrum observed. Then, the G value was calculated based on the following equation.

$$G \text{ value} = \frac{\text{peak integrated intensity of 1580 cm}^{-1} \text{ derived from graphitic structure}}{\text{peak integrated intensity of 1350 cm}^{-1} \text{ derived from amorphous structure}}$$

The excitation light was radiated under the following conditions.

Laser light: $Ar^+$ laser
Excitation wavelength: 514.5 nm
Excitation intensity: 200 mW
Slit width: 400-800-800-400 μm
Step width: 2.0 $cm^{-1}$ The integrating time was set to 4 to 8 seconds per channel, with the number of integration being one.

After the carbon material powder was thus formed, an anode was produced.

First, the carbon material powder was pre-heated in an Ar atmosphere, with a temperature rising rate of approximately 30° C. per minute, an ultimate temperature of 600° C., and a retention time of one hour at the ultimate temperature. The pre-heating was conducted immediately before an anode mix was produced. The anode carbon material powder was mixed with polyvinylidene fluoride as a binder of an amount equivalent to 10% by weight and dimethyl formamide as a solvent. The resulting mixture was dried to prepare the anode mix. 37 mg of the anode mix was mixed with Ni mesh as a collector, and the mixture was shaped into a pellet, 15.5 mm in diameter, to form the anode.

Using the anode thus produced, a non-aqueous liquid electrolyte secondary battery of the following structure was produced.

Battery shape: coin-shape cell, 20 mm in diameter, 2.5 mm in thickness
Cathode: lithium metal
Separator: polypropylene porous film
Liquid electrolyte: formed by dissolving $LiPF_6$ at a rate of 1 mol/l into a non-aqueous solvent formed by mixing EC and DEC at a mixing volume ratio of EC:DEC=1:1
Collector: copper foil

EXAMPLE 2

A carbon material powder was formed in a manner similar to Example 1, except for setting the pre-heating temperature of the coal pitch coke to 2800° C. Using this carbon material powder as the anode material, a non-aqueous liquid electrolyte secondary battery was produced.

The interplanar distance $d_{002}$ of the (002) plane, the crystallite size $Lc_{002}$ of the (002) plane and the G value are shown in Table 1. The true density and the grain diameter are shown in Table 2.

EXAMPLE 3

A non-aqueous liquid electrolyte secondary battery was produced in a manner similar to Example 1, except for using a carbon material powder formed by grinding natural graphite produced in Madagascar as the anode material.

The interplanar distance $d_{002}$ of the (002) plane, the crystallite size $Lc_{002}$ of the (002) plane and the G value are shown in Table 1. The true density and the grain diameter are shown in Table 2.

EXAMPLE 4

A non-aqueous liquid electrolyte secondary battery was produced in a manner similar to Example 1, except for using a carbon material powder formed by grinding natural graphite produced in Sri Lanka as the anode material.

The interplanar distance $d_{002}$ of the (002) plane, the crystallite size $Lc_{002}$ of the (002) plane and the G value are shown in Table 1. The true density and the grain diameter are shown in Table 2.

EXAMPLE 5

A non-aqueous liquid electrolyte secondary battery was produced in a manner similar to Example 1, except for using a carbon material powder formed by grinding natural graphite produced in China as the anode material.

The interplanar distance $d_{002}$ of the (002) plane, the crystallite size $Lc_{002}$ of the (002) plane and the G value are shown in Table 1. The true density and the grain diameter are shown in Table 2.

EXAMPLE 6

A non-aqueous liquid electrolyte secondary battery was produced in a manner similar to Example 1, except for using a carbon material powder formed by grinding artificial graphite KS-75 produced by Lonza as the anode material.

The interplanar distance $d_{002}$ of the (002) plane, the crystallite size $Lc_{002}$ of the (002) plane and the G value are shown in Table 1. The true density and the grain diameter are shown in Table 2.

EXAMPLE 7

A non-aqueous liquid electrolyte secondary battery was produced in a manner similar to Example 1, except for using a carbon material powder formed by grinding artificial graphite KS-15 produced by Lonza as the anode material.

The interplanar distance $d_{002}$ of the (002) plane, the crystallite size $Lc_{002}$ of the (002) plane and the G value are shown in Table 1. The true density and the grain diameter are shown in Table 2.

COMPARATIVE EXAMPLE 1

A coal pitch coke was calcined at 1200° C., and was ground without being heat-treated, to form a carbon material powder. A non-aqueous liquid electrolyte secondary battery was produced in a manner similar to Example 1, except for using the carbon material powder thus produced as the anode material.

The interplanar distance $d_{002}$ of the (002) plane, the crystallite size $Lc_{002}$ of the (002) plane and the G value are shown in Table 1. The true density and the grain diameter are shown in Table 2.

COMPARATIVE EXAMPLE 2

A non-aqueous liquid electrolyte secondary battery was produced in a manner similar to Example 1, except for using a carbon material powder, as the anode material, produced by grinding a carbon material formed as follows.

Petroleum pitch having an H/C atomic ratio selected from a range of 0.6 to 0.8 was ground and oxidized in an air stream, to form a carbon precursor. This carbon precursor had 80% of quinoline insoluble measured with the JIS centrifuge method K2425-1983, and had an oxygen percentage content of 15.4% by weight measured by organic element analysis. The carbon precursor was ground and 10 g of it was filled into a pot. The ground carbon precursor in the pot was retained at 500° C. for five hours in a nitrogen stream, then heated up to 1100° C. and heat-treated for one hour, to form the carbon material.

The interplanar distance $d_{002}$ of the (002) plane, the crystallite size $Lc_{002}$ of the (002) plane and the G value are shown in Table 1. The true density and the grain diameter are shown in Table 2.

COMPARATIVE EXAMPLE 3

A non-aqueous liquid electrolyte secondary battery was produced in a manner similar to Example 1, except for using a carbon material powder formed by grinding natural earthy graphite produced in Mexico as the anode material.

The interplanar distance $d_{002}$ of the (002) plane, the crystallite size $Lc_{002}$ of the (002) plane and the G value are shown in Table 1. The true density and the grain diameter are shown in Table 2.

TABLE 1

| | Interplanar Distance of (002) plane $d_{002}$ | C-axis Crystallite Size of (002) plane $Lc_{002}$ | G value |
| --- | --- | --- | --- |
| Example 1 | 0.3371 | 30.2 | 13.57 |
| Example 2 | 0.3376 | 25.1 | 12.98 |
| Example 3 | 0.3360 | 38.1 | 2.81 |
| Example 4 | 0.3355 | 26.9 | 4.25 |
| Example 5 | 0.3358 | 35.4 | 4.06 |
| Example 6 | 0.3358 | 25.4 | 8.82 |
| Example 7 | 0.3363 | 22.4 | 3.97 |
| Comparative Example 1 | 0.3487 | 2.0 | 1.07 |
| Comparative Example 2 | 0.3802 | 1.0 | 0.37 |
| Comparative Example 3 | 0.3356 | 16.1 | 2.43 |

TABLE 2

| | True Density (g/ml) | Average Grain Diameter (μm) | Content (%) of Powder Not Greater Than 1 μm in Diameter | Minimum Grain Diameter (μm) |
| --- | --- | --- | --- | --- |
| Example 1 | 2.21 | 34.2 | 0 | 6.6 |
| Example 2 | 2.20 | 33.8 | 0 | 9.4 |
| Example 3 | 2.29 | 36.1 | 0 | 3.4 |
| Example 4 | 2.25 | 9.5 | 0 | 2.6 |
| Example 5 | 2.26 | 11.8 | 0 | 2.6 |
| Example 6 | 2.23 | 28.4 | 0 | 2.6 |
| Example 7 | 2.23 | 4.9 | 0 | 1.7 |
| Comparative Example 1 | 2.01 | 34.8 | 0 | 6.6 |
| Comparative Example 2 | 1.54 | 21.8 | 0 | 4.7 |
| Comparative Example 3 | 2.19 | 4.0 | 8.4 | 0.4 |

The capacity per gram of carbon material, the capacity loss and the active material packing density ratio of the non-aqueous liquid electrolyte secondary batteries produced in Examples 1 to 7 and Comparative Examples 1 to 3 were measured. The results are shown in Table 3.

The capacity and the capacity loss were measured as follows.

[Measurement of Battery Capacity and Capacity Loss]

A charge/recess cycle of charging the battery at a current density of 0.53 mA/cm² for one hour and then having a 2-hour recess was repeated, which is a doping process. The charge/recess cycle ended when the equilibrium potential presumed by plotting the change in potential during the recess along $(time)^{-1/2}$ and extrapolating the change into $(time)=\infty$ reached 10 mV (Li/Li⁺). Thus, the charge capacity was found.

Then, a discharge/recess cycle of discharging the battery at a current density of 0.53 mA/cm² and a cut-off voltage set to a terminal voltage of 1.5 V and then having a 2-hour recess was repeated, which is an undoping process. The discharge capacity was thus found.

The capacity loss was found by subtracting the discharge capacity from the charge capacity.

Strictly, the process of doping lithium into the carbon material in this test is not the charge process but the discharge process. However, in accordance with an actual battery, the doping process is regarded as the charge process, while the undoping process is regarded as the discharge process.

TABLE 3

| | Capacity (mAh/g) | Capacity Loss (mAh/g) | Packing Density Ratio | Capacity Ratio Per Volume (Capacity × Packing Density Ratio) |
| --- | --- | --- | --- | --- |
| Example 1 | 305 | 100 | 1.23 | 375.15 |
| Example 2 | 297 | 57 | 1.23 | 365.31 |
| Example 3 | 320 | 77 | 1.33 | 425.6 |
| Example 4 | 330 | 92 | 1.28 | 422.4 |
| Example 5 | 330 | 107 | 1.28 | 422.4 |
| Example 6 | 340 | 78 | 1.27 | 431.8 |
| Example 7 | 329 | 120 | 1.30 | 427.7 |
| Comparative Example 1 | 240 | 77 | 1.20 | 288.0 |
| Comparative Example 2 | 350 | 150 | 1.00 | 350.0 |
| Comparative Example 3 | 333 | 238 | 1.24 | 412.92 |

As seen in Table 3, in the non-aqueous liquid electrolyte secondary batteries of Examples 1 to 7 using the carbon material powders satisfying the predetermined conditions of true density and parameters of crystalline structure as the anode materials, the anode materials are packed at higher packing densities and the capacity ratios per volume are greater than in the non-aqueous liquid electrolyte secondary batteries of Comparative Examples 1 to 3. In addition, the batteries of Examples 1 to 7 have less capacity loss than the batteries of Comparative Examples 1 to 3.

Therefore, it has been found that using the carbon material powder satisfying the predetermined conditions of true density and parameters of crystalline structure as the anode material is effective for producing a non-aqueous liquid electrolyte secondary battery having a high energy density.

EXAMPLE 8

A non-aqueous liquid electrolyte secondary battery was produced in a manner similar to Example 1, except for using a carbon material powder formed by grinding natural graphite produced in Madagascar, that is, the carbon material powder formed in Example 3, as the anode material.

EXAMPLE 9

A non-aqueous liquid electrolyte secondary battery was produced in a manner similar to Example 8, except for using a non-aqueous solvent formed by mixing EC with MEC at a volume ratio of EC:MEC=1:1.

EXAMPLE 10

A non-aqueous liquid electrolyte secondary battery was produced in a manner similar to Example 8, except for using a non-aqueous solvent formed by mixing EC, DEC and DMC at a volume ratio of EC:DEC:DMC=2:1:1.

EXAMPLE 11

A non-aqueous liquid electrolyte secondary battery was produced in a manner similar to Example 8, except for using a non-aqueous solvent formed by mixing EC with DMC at a volume ratio of EC:DMC=1:1.

(1) Types of Non-aqueous Solvent

The capacity ratio at 20° C. and at −20° C., and the freezing point of the electrolytes of the non-aqueous liquid electrolyte secondary batteries were investigated. The results are shown in Table 4.

The capacity ratio was measured by repeating 10 cycles of constant current charge/discharge from 10 mV (Li/Li$^+$) up to 1500 mV, at 20° C. with a current density of 0.53 mA/cm$^2$. The capacity measured in the 10th cycle was determined as the capacity at normal temperatures. Then, the 11th charge/discharge cycle was conducted at −20° C., and the capacity measured in the 11th cycle was determined as the capacity at low temperatures.

TABLE 4

|  | Composition of Non-aqueous Solvent | Freezing Point | Battery Capacity Ratio at 20° C. | Battery Capacity Ratio at −20° C. |
| --- | --- | --- | --- | --- |
| Example 8 | EC:DEC = 1:1 | −60° C. or lower | 1.00 | 1.00 |
| Example 9 | EC:MEC = 1:1 | −60° C. or lower | 1.07 | 1.10 |
| Example 10 | EC:DEC:DMC = 2:1:1 | −60° C. or lower | 1.07 | 1.08 |
| Example 11 | EC:DMC = 1:1 | −30° C. | 1.06 | 0.97 |

As seen in Table 4, the batteries of Examples 8 to 11 have high capacity ratios at normal temperatures, low freezing points of the electrolytes, and high capacity ratios even at low temperatures.

It has been found from the above that a non-aqueous solvent consisting mainly of EC and containing chain carbonic ester as the second component solvent is preferred if the carbon material satisfying the predetermined conditions of parameters of crystalline structure and true density is used as the anode material.

However, if only DMC is used as the second component solvent, the freezing point of the electrolyte is higher and the capacity ratio at low temperatures is lower than otherwise.

It has been thus found that, instead of single DMC, a mixed solvent of DMC and DEC or asymmetrical chain carbonic ester, such as MEC, is preferred for the battery which may be left at −30° C. or lower temperatures.

Meanwhile, if the battery is overcharged, the problems of the lithium metal precipitation and its reaction with the non-aqueous solvent arise. Thus, reactivity with lithium of DEC, DMC and MEC used as the second component solvents of the batteries in Examples 8, 9 and 11 was investigated.

First, one of DEC, DMC and MEC was stored in a container made of teflon, into which a lithium metal piece was introduced. The teflon container was sealed so that moisture would not intrude into it, and was stored in a thermostatic oven at various temperatures. The states of solvent and lithium were observed.

The results are shown in Table 5.

TABLE 5

| Storage Condition | 60° C. | 70° C. | 80° C. | 60° C., 1 Week |
| --- | --- | --- | --- | --- |
| DEC | Not Reacted | Not Reacted | Reacted After 10 Minutes | Solvent Browned, Solidified |
| DMC | Not Reacted | Not Reacted | Not Reacted | Partly Blackened |
| MEC | Not Reacted | Not Reacted | Not Reacted | Partly Blackened |

As seen in Table 5, DEC has the highest reactivity with lithium of the three solvents. If lithium is introduced into DEC, though a natural oxidation film on the surface of the lithium metal prevents an immediate reaction at a certain high storage temperature, the solvent gradually starts reacting with lithium. For instance, after storage at 60° C. for one week, lithium is eliminated and DEC is browned. On the other hand, if lithium is introduced into DMC or MEC, lithium rarely reacts with the solvent. If DEC is used, the reactivity with the lithium metal is lowered by mixing DMC with DEC.

Thus, it has been found that mixing DMC with DEC prevents DEC from reacting with the lithium metal, and is effective for improving safety of the battery.

(2) Mixing Rate of Non-aqueous Solvent

The conductivity of the non-aqueous solvent of the batteries of Examples 8, 9 and 11 at 25° C. and at −20° C. was measured with various mixing rates of EC and the second component solvent. The relation between the EC mixing rate and the conductivity measured at 25° C. is shown in FIG. 1. The relation between the EC mixing rate and the conductivity measured at −20° C. is shown in FIG. 2.

Figure 2:
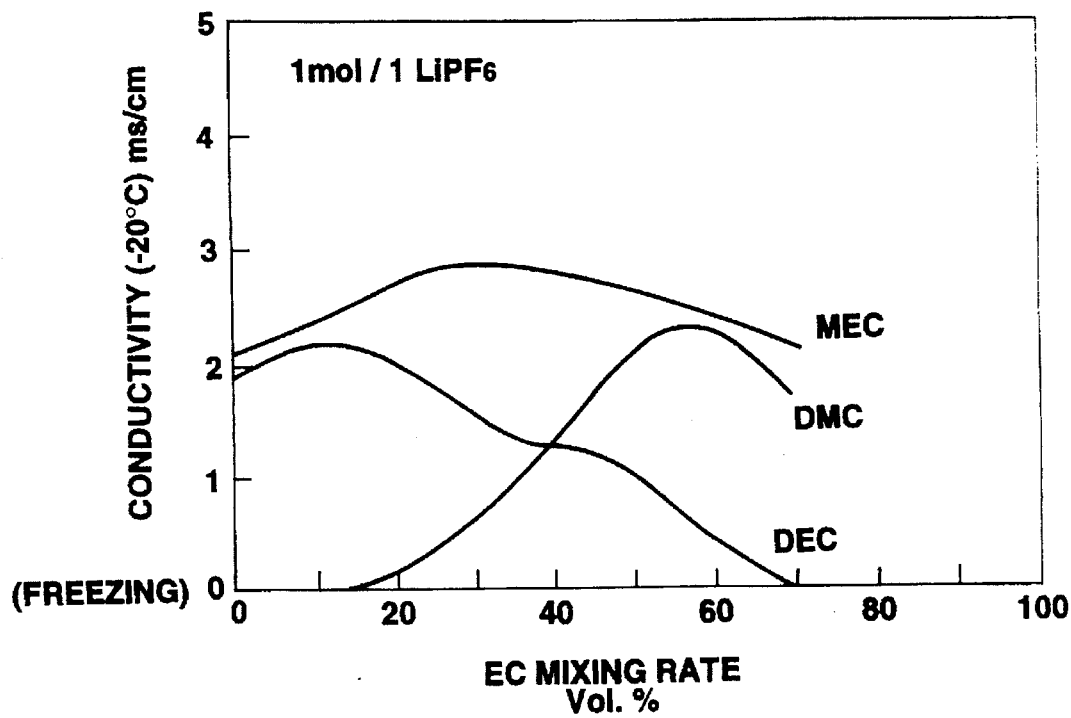
FIG. 2 is a graph showing the relation between the EC mixing rate of the non-aqueous solvent and conductivity at −20° C.

As seen from comparison between FIGS. 1 and 2, the conductivity of the battery is significantly lower at −20° C. than at 25° C.

As shown in the measurement at 25° C. in FIG. 1, the conductivity rises along with the increase in the EC mixing rate and is saturated as the EC mixing rate reaches approximately 60% by volume, with any of the above second component solvents. It is found from FIG. 1 that the optimum range of the EC mixing rate is 10 to 60% by volume.

In addition, practical conductivity can be obtained even at −20° C. as shown in FIG. 2. With any of the above second component solvent, the conductivity rises along with the increase in the EC mixing rate up to a certain point of the EC mixing rate, and is lowered along with the increase in the EC mixing rate exceeding a certain point.

However, the optimum range of the EC mixing rate varies depending upon the second component solvent at low temperatures. If DEC is used as the second component, the EC mixing rate is set to 60% by volume or lower. If DMC is used, the EC mixing rate is set to 30% by volume or higher. If MEC is used, the EC mixing rate is set to 10 to 60% by volume. Thus, a high conductivity can be obtained.

Accordingly, if properties at low temperatures as well as normal temperatures are problematical, it is desirable to select the EC mixing rate in accordance with the type of the second component solvent based on the above data.

What is claimed is:

1. A non-aqueous liquid electrolyte secondary battery comprising:

an anode formed of a carbon material having a grain diameter of 1 μm and greater and having a true density of 2.2 g/cm$^3$ and greater, an interplanar distance of (002) plane of not less than 0.335 nm and not greater than 0.338 nm, a crystallite size of the (002) plane of 20 nm and greater, and a G value in the Raman spectrum of 2.5 and greater;

a cathode formed of a transition metal composite oxide containing lithium of an amount equivalent to a charge/discharge capacity of not less than 300 mAh per gram of the carbon material; and a liquid electrolyte formed by dissolving an electrolyte into a non-aqueous solvent, said non-aqueous solvent comprising ethylene carbonate and a chain carbonic ester selected from methylethylcarbonate or a mixture of diethylcarbonate and dimethylcarbonate.

2. The non-aqueous liquid electrolyte secondary battery as claimed in claim 1, wherein the ethylene carbonate and the chain carbonic ester are mixed at a volume ratio of 10:90 to 60:40 as expressed by the ethylene carbonate : chain carbonic ester ratio.

3. The non-aqueous liquid electrolyte secondary battery as claimed in claim 1, wherein the diethyl carbonate and the dimethyl carbonate are mixed at a volume ratio of 30:70 to 80:20 as expressed by the diethyl carbonate: dimethyl carbonate ratio.

4. The non-aqueous liquid electrolyte secondary battery as claimed in claim 1, wherein the chain carbonic ester is methylethyl carbonate.

* * * * *